Patented May 4, 1948

2,440,724

UNITED STATES PATENT OFFICE 2,440,724

N-SUBSTITUTED, 2-BUTENE-1,4-DIAMINES, AND PROCESS FOR PREPARING

Glen H. Morey, Terre Haute, Ind., assignor to Commercial Solvents Corporation, Terre Haute, Ind., a corporation of Maryland No Drawing. Application October 27, 1944, Serial No. 560,714

12 Claims. (Cl. 260—583)

This invention relates to new N-substituted 2-butene-1,4-diamines and to a method of preparing them, and more particularly to N-substituted 2-butene-1,4-diamines in which the N substituent groups contain from 3 to 6 carbon atoms inclusive, and which have the following general formula:

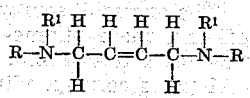

wherein R and R¹ may be the same or different and may be alkyl or alkenyl groups containing from 3 to 6 carbon atoms inclusive.

Among the new compounds of my invention are included the following: 2-butene-1,4-bis-dipropylamine; 2-butene-1,4-bis-diisopropylamine; 2-butene-1,4-bis-dibutylamine; 2-butene-1,4-bis-diisobutylamine; 2-butene-1,4-bis-diamylamine; 2-butene-1,4-bis-diisoamylamine; 2-butene-1,4-bis-dihexylamine; 2-butene-1,4-bis-propylbutylamine; 2-butene-1,4-bis-butylamylamine; 2-butene-1,4-bis-diallylamine, and the like.

The first member of the series of compounds of my invention, namely 2-butene-1,4-bis-dimethylamine is old and is described in Beilstein, vol. 4, p. 273. I have found, however, that while this old compound, namely 2-butene-1,4-bis-dimethylamine and its next higher homolog are of no value as insecticides, the compounds of the series having from 3 to 6 carbon atoms inclusive in the N-substituent groups are especially effective for this purpose, particularly when used in sprays for combating flies, mosquitoes, and common agricultural insect pests, as set forth in my co-pending application, U. S. Serial No. 529,667, now Patent No. 2,415,020.

In preparing the N-substituted 2-butene-1,4-diamines of my invention, I react 1,4-dichloro-2-butene with a secondary alkyl or alkenyl amine in the proportion of at least four moles of the secondary amine to one mole of dichloro compound. I prefer, however, to use an appreciable excess of secondary amine, for example, at least 50% excess, that is, a proportion of about six moles or more of secondary amine to one mole of 1,4-dichloro-2-butene to insure conversion of the maximum proportion of dichloro compound to N-substituted 2-butene-1,4-diamine, primarily by providing enough secondary amine both to form the substituted diamine compound and to react with the chlorine liberated from the dichloro compound to form the amine hydrochloride. This use of excess amine serves to prevent undesired side reactions from taking place with incident reduction in the yield of the desired N-substituted 2-butene-1,4-diamine. Moreover, by employing an excess of secondary amine, there is sufficient of the secondary amine present to serve as a solvent for the reaction. Other solvents may be used, however, which are inert toward the reactants, and for this purpose hydrocarbons, alcohols, ethers, and the like are suitable. The reaction is preferably initiated at ordinary room temperatures. However, the heat of reaction may cause the temperature to rise somewhat, and in such cases it is desirable to cool the mixture, to maintain the temperature below about 85° during the initial stages of the reaction, otherwise darkening of the reaction mixture may occur and a reduction in yield results. The temperature at which reaction proceeds most favorably varies with the amine used, some amines reacting vigorously with 1,4-dichloro-2-butene at or below room temperatures, so that cooling must be resorted to, to prevent the temperature from rising too high. Other amines react more slowly, so that no cooling is required. Still others may react so slowly at room temperatures, that moderate heating will be required to speed up the reaction somewhat. In any case, even as to the slowly reacting amines, I have found that the temperature of the reaction in its initial stages, should not exceed about 85° C. for best results, although at higher temperatures, quantities of the desired products will be obtained in somewhat lower yields. After the major part of the reaction has taken place, higher temperatures apparently do no harm and may even be desirable to bring the reaction to substantial completion.

When the reaction appears to be complete, usually in a matter of several hours, an aqueous solution of a strong base such as sodium or potassium hydroxide may be added to the reaction mixture to liberate the excess secondary amine from the hydrogen chloride with which it has combined during the course of the reaction. This addition causes the formation of two liquid layers, the lower layer consisting chiefly of water and sodium or potassium chloride, the upper layer consisting principally of the desired N-substituted 2-butene-1,4-diamine, together with the excess secondary amine. The two layers are separated, and the upper layer containing the crude N-substituted 2-butene-1,4-diamine is fractionated under reduced pressure, and the purified product recovered.

Instead of adding a base such as sodium hydroxide, at the stage described above, the reaction mass may be simply filtered to remove the crystalline secondary amine hydrochloride, and the filtrate may then be distilled to recover the N-substituted 2-butene-1,4-diamine.

My invention may be further illustrated by the following specific examples.

*Example I.—2-butene-1,4-bis-dibutylamine*

Seven moles, 875 parts, of 1,4-dichloro-2-butene was added to 42 moles, 5420 parts of dibutylamine in a reaction vessel. Reaction proceeded slowly over several hours while the temperature rose gradually to 60° C. The mixture was cooled to prevent the temperature from rising above 60° C. After standing for sixty-five hours, 3100 parts of sodium hydroxide solution containing 18 moles of sodium hydroxide was added and the mixture stirred vigorously for three hours. An oily layer separated and this layer was fractionated on a fractionating column. Most of the unreacted dibutylamine was fractionated off at atmospheric pressure up to a kettle temperature of 180° C. The last traces were fractionated off at 50 mm. pressure up to a kettle temperature of 160° C. and the remaining product was then distilled at 2 mm. pressure up to a pot temperature of 180° C. The product, 2-butene-1,4-bis-dibutylamine, amounted to 2044 parts, 6.58 moles, a yield of 94% based on the chloro compound.

*Example II.—2-butene-1,4-bis-dibutylamine*

One mole, 125 parts, of 1,4-dichloro-2-butene was mixed with 6 moles, 774 parts, of dibutylamine. Over a period of about two hours, the temperature rose about 10° C. to about 35° C. and crystals formed. The mixture was stirred at room temperature for about twenty hours. It was then heated in a water bath to 90° C. and stirred for two hours. The crystals of dibutylamine hydrochloride were filtered out and the filtrate from the crystals was again heated at 90° C. for three hours. More crystals formed, and these crystals in turn were filtered out and the filtrate was washed with water until nearly free of chlorides. The excess dibutylamine was then distilled off. The remaining product, 302 parts, was washed with water and distilled at 1 mm. pressure and resulted in 280 parts of 2-butene-1,4-bis-dibutylamine, corresponding to a yield of 71.3%. The neutral equivalent found was 154.5. Theory 155.

*Example III.—2-butene-1,4-bis-diisobutylamine*

Two moles, 250 parts of 1,4-dichloro-2-butene was added to 10.6 moles, 1367 parts of diisobutylamine in a reaction vessel. The solution was heated on a steam bath to about 70° C. After standing overnight on the steam bath, a large amount of crystals was present. To this mixture was added 5 moles of sodium hydroxide dissolved in 1000 parts of water and the solution stirred vigorously. Two layers separated and the oily layer was collected and most of the excess dibutylamine fractionated off at atmospheric pressure. The last portions were fractionated at 50 mm. pressure. The material remaining in the column kettle was the desired product, 2-butene-1,4-bis-diisobutylamine. It was distilled at 3 mm. and resulted in 544 parts of product corresponding to a yield of 87.8%.

*Example IV.—2-butene-1,4-bis-diallylamine*

715 parts, 7.38 moles, of diallylamine was placed in a reaction vessel and 1.475 moles, 184 parts, of 1,4-dichloro-2-butene was added. The mixture was heated to 60° C. in a hot water bath. Reaction proceeded rapidly and the mixture was cooled by a cold water bath to maintain the temperature below about 80° C. Four moles of sodium hydroxide in 500 parts of water were added and the mixture stirred while heating to 80° C. The oil layer which separated was collected. The excess diallylamine was fractionated off. The product was distilled at 3 mm. pressure and resulted in 289 parts of product, corresponding to a yield of 79.6%.

*Example V.—2-butene-1,4-bis-diisopropylamine*

110 parts, 0.88 moles, of 1,4-dichloro-2-butene was mixed with 494 parts, 4.89 moles, of diisopropylamine in a reaction flask fitted with a reflux condenser. The solution was refluxed at about 85° C., whereupon the reaction proceeded rather slowly as evidenced by the slow formation of the amine hydrochloride crystals. After refluxing for twelve hours, the mixture was cooled and 200 parts of sodium hydroxide solution containing 20 parts, ½ mole, of sodium hydroxide was added. This mixture was stirred and refluxed for eight hours, and then an additional 20 parts, ½ mole, of sodium hydroxide was added to liberate the excess amine. The refluxing was continued for sixteen hours. The excess diisopropylamine was fractionated off and the 2-butene-1,4-bis-diisopropylamine was distilled at 4 mm. pressure and amounted to 111 parts corresponding to a yield of 49.7%.

*Example VI.—2-butene-1,4-bis-dipropylamine*

Two moles, 250 parts, of 1,4-dichloro-2-butene was added to 12 moles, 1212 parts, of dipropylamine in a reaction vessel. After a few minutes, the temperature of the mixture rose to about 60° C. and was then cooled to 50° C. After standing overnight the crystals were filtered off and washed with dipropylamine. The excess dipropylamine was fractionated off and the product 2-butene-1,4-bis-dipropylamine was distilled at 3 mm. pressure at a kettle temperature of 120–135° C. The crystals were treated with sodium hydroxide solution and more dipropylamine and product recovered. The total product amounted to 464 parts, corresponding to a yield of 91.3%.

While the above describes the preferred embodiments of the invention, it will be understood that departures may be made therefrom within the scope of the specification and claims.

What is claimed is:

1. As new compositions of matter N-substituted 2-butene-1,4-diamines having the following formula:

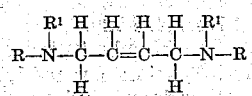

wherein R and $R^1$ are members selected from the group consisting of alkyl groups and alkenyl groups containing from 3 to 6 carbon atoms inclusive.

2. 2-butene-1,4-bis-diisobutylamine.
3. 2-butene-1,4-bis-dipropylamine.
4. 2-butene-1,4-bis-dibutylamine.

5. In a method for preparing N-substituted 2-butene-1,4-diamines having the formula

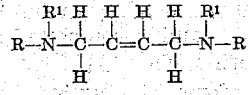

wherein R and R' represent members selected from the group consisting of alkyl and alkenyl radicals containing from 3 to 6 carbon atoms inclusive, the step which comprises reacting 1,4-dichloro-2-butene with a secondary amine selected from the group consisting of dialkylamines and dialkenylamines wherein the substituent groups contain from 3 to 6 carbon atoms inclusive in the proportion of at least 4 moles of disubstituted amine per mole of 1,4-dichloro-2-butene.

6. In a method for preparing N-substituted 2-butene-1,4-diamines having the formula

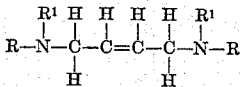

wherein R and R' represent members selected from the group consisting of alkyl and alkenyl radicals containing from 3 to 6 carbon atoms inclusive, the step which comprises reacting 1,4-dichloro-2-butene with a secondary amine selected from the group consisting of dialkylamines and dialkenylamines wherein the substituent groups contain from 3 to 6 carbon atoms inclusive in the proportion of at least 6 moles of disubstituted amine per mole of 1,4-dichloro-2-butene.

7. In a method for preparing N-substituted 2-butene-1,4-diamines having the formula

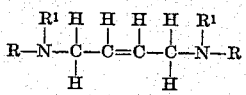

wherein R and R' represent members selected from the group consisting of alkyl and alkenyl radicals containing from 3 to 6 carbon atoms inclusive, the step which comprises reacting 1,4-dichloro-2-butene with a secondary amine selected from the group consisting of dialkylamines and dialkenylamines wherein the substituent groups contain from 3 to 6 carbon atoms inclusive at temperatures not exceeding about 85° C.

8. In a method for preparing N-substituted 2-butene-1,4-diamines having the formula

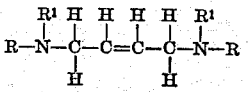

wherein R and R' represent members selected from the group consisting of alkyl and alkenyl radicals containing from 3 to 6 carbon atoms inclusive, the step which comprises reacting 1,4-dichloro-2-butene with a secondary amine selected from the group consisting of dialkylamines and dialkenylamines wherein the substituent groups contain from 3 to 6 carbon atoms inclusive in the proportion of at least 4 moles of disubstituted amine per mole of 1,4-dichloro-2-butene, and at temperatures not exceeding about 85° C.

9. In a method for preparing N-substituted 2-butene-1,4-diamines having the formula

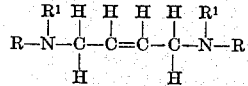

wherein R and R' represent members selected from the group consisting of alkyl and alkenyl radicals containing from 3 to 6 carbon atoms inclusive, the step which comprises reacting 1,4-dichloro-2-butene with a secondary amine selected from the group consisting of dialkylamines and dialkenylamines wherein the substituent groups contain from 3 to 6 carbon atoms inclusive in the proportion of at least 6 moles of disubstituted amine per mole of 1,4-dichloro-2-butene, and at temperatures not exceeding about 85° C.

10. In a method for preparing 2-butene-1,4-bis-dibutylamines, the step which comprises reacting dibutylamine with 1,4-dichloro-2-butene at temperatures not exceeding about 85° C. and in the proportion of at least 4 moles of dibutylamine per mole of 1,4-dichloro-2-butene.

11. In a method for preparing 2-butene-1,4-bis-diisobutylamine, the step which comprises reacting diisobutylamine with 1,4-dichloro-2-butene at temperatures not exceeding about 85° C. and in the proportion of at least 4 moles of diisobutylamine per mole of 1,4-dichloro-2-butene.

12. In a method for preparing 2-butene-1,4-bis-dipropylamine, the step which comprises reacting dipropylamine with 1,4-dichloro-2-butene at temperatures not exceeding about 85° C. and in the proportion of at least 4 moles of dipropylamine per mole of 1,4-dichloro-2-butene.

GLEN H. MOREY.

REFERENCES CITED

The following references are of record in the file of this patent:

UNITED STATES PATENTS

| Number | Name | Date |
| --- | --- | --- |
| 2,172,822 | Tamele | Sept. 12, 1939 |
| 2,216,548 | Converse | Oct. 1, 1940 |

OTHER REFERENCES

Beilstein: Handbuch der Organische Chemie, 4th ed., vol. IV, page 273; ibid., 1st suppl., pages 423–424; ibid., 2nd suppl., pages 713–714.